US008056909B2

(12) United States Patent
Burdwood et al.

(10) Patent No.: US 8,056,909 B2
(45) Date of Patent: Nov. 15, 2011

(54) SHOPPING CART

(75) Inventors: William Richard Burdwood, Wexford, PA (US); George McConnell Davison, III, Pittsburgh, PA (US); Peter Arthur Meier, Pittsburgh, PA (US); Jason Reed Rogge, Belle Vernon, PA (US); Colin Derek Curry, Pittsburgh, PA (US); Jonathon Bruce Lanham, Brackenridge, PA (US)

(73) Assignee: Phoenix Intangibles Holding Company, Greenville, DE (US)

( * ) Notice: Subject to any disclaimer, the term of this patent is extended or adjusted under 35 U.S.C. 154(b) by 442 days.

(21) Appl. No.: 12/434,232

(22) Filed: May 1, 2009

(65) Prior Publication Data

US 2010/0276899 A1 Nov. 4, 2010

(51) Int. Cl.
*B62D 39/00* (2006.01)
(52) U.S. Cl. .............................. 280/33.991; 280/33.997
(58) Field of Classification Search ............. 280/33.991, 280/33.992, 33.993, 33.994, 33.996, 33.997, 280/47.34
See application file for complete search history.

(56) References Cited

U.S. PATENT DOCUMENTS

| | | | | |
|---|---|---|---|---|
| 3,015,494 A * | 1/1962 | Fosbrook, Sr. | ........... | 280/33.991 |
| 4,519,622 A * | 5/1985 | Levy-Joseph | ........... | 280/33.997 |
| 4,647,055 A * | 3/1987 | Weill | ........... | 280/33.992 |
| 5,106,111 A * | 4/1992 | Ondrasik | ........... | 280/33.991 |
| 5,409,245 A * | 4/1995 | Kern et al. | ........... | 280/47.34 |
| 6,315,306 B1 * | 11/2001 | Fernie et al. | ........... | 280/33.991 |
| 6,488,292 B2 * | 12/2002 | O'Quin | ........... | 280/33.991 |
| 6,761,364 B2 * | 7/2004 | Murar et al. | ........... | 280/33.991 |
| 6,923,456 B2 * | 8/2005 | Ryan et al. | ........... | 280/33.991 |
| 7,168,711 B2 * | 1/2007 | Ondrasik | ........... | 280/33.991 |
| 7,216,875 B2 | 5/2007 | O'Quin | | |
| 7,407,169 B2 | 8/2008 | Splain et al. | | |
| 7,673,886 B2 * | 3/2010 | Ondrasik | ........... | 280/33.991 |
| 2003/0205875 A1 * | 11/2003 | Ondrasik et al. | ........... | 280/47.34 |
| 2004/0046341 A1 * | 3/2004 | Wilkinson | ........... | 280/33.991 |

* cited by examiner

*Primary Examiner* — Hau Phan
(74) *Attorney, Agent, or Firm* — Eckert Seamans Cherin & Mellott, LLC; Stephen A. Buccianeri, Esquire; David V. Radack, Esquire

(57) ABSTRACT

A shopping cart includes a frame, a number of front wheel assemblies and a number of rear wheel assemblies that are coupled to and support the frame, and a main container coupled to the frame. The main container includes a base, a front panel, a rear panel, and a pair of opposing side panels each having a tope edge. The front panel and the pair of opposing side panels are coupled together and extend upward from the base. The rear panel is pivotally coupled to the frame. A portion of the main container is structured to engage each of the corresponding top edges of the opposing side panels of another similarly constructed cart as the other cart is nested into the shopping cart. The engagement causes the number of rear wheel assemblies of the shopping cart to be moved from a first position to a second position generally above the first position.

24 Claims, 9 Drawing Sheets

SHOPPING CART

FIELD OF THE INVENTION

This invention generally relates to a shopping cart. More particularly, the invention relates to a shopping cart that is nestable into a similarly constructed shopping cart. This invention provides the shopping cart with a rear castor lifting capability among other beneficial features.

BACKGROUND OF THE INVENTION

Shopping carts are known in the art and generally include a frame, a main container, wheel assemblies and a handle for pushing the cart. Traditionally, such carts were made primarily of metal for durability and ease of fabrication. However, several factors, including increases in production costs due to rising material and labor costs, as well as maintenance costs related to repairing seat mechanisms and wheel assemblies have made such traditional designs less desirable.

Known shopping carts are commonly designed to be nestable into another, similarly constructed cart and to enable a following, similarly constructed cart to be nested into the shopping cart. Commonly, in retail stores and in parking areas near retail stores, long lines of nested shopping carts may be formed which must be moved by store personnel.

Typically, the rear casters of a shopping cart, unlike the front casters, does not swivel. Such arrangement is generally desirable as it allows for ease of control and maneuvering of a single shopping cart with little effort. However, such arrangement commonly results in high stresses applied to the rear casters and wheels when a line of nested shopping carts is moved. Such stresses tend to cause portions of the rear castors to bend and break and tends to cause the bearings and treads of said castors to wear excessively, particularly as attempts are made to turn a line of nested shopping carts.

U.S. Pat. Nos. 6,923,456 B2 and 7,216,875, the disclosures of which are incorporated by reference herein, describe shopping carts being nestable similarly and having a rear caster-lifting capabilities. However such designs are directed toward use on traditional metal carts which leave much room for improvement.

Accordingly, a need exists in the art for shopping carts that are less expensive to manufacture and to maintain.

SUMMARY OF THE INVENTION

Certain objects of the invention are achieved by providing a shopping cart comprising a frame, a number of front wheel assemblies and a number of rear wheel assemblies that are coupled to and support the frame, and a main container coupled to the frame. The main container comprising a base, a front panel, a rear panel, and a pair of opposing side panels each having a top edge. The front panel and the pair of opposing side panels are coupled together and extend upward from the base, and the rear panel is pivotally coupled at or near the frame. A portion of the main container is structured to engage each of the top edges of the opposing side panels of another similarly constructed cart as the other cart is being nested into the shopping cart, the engagement causing the number of rear wheel assemblies to be moved from a first position to a second position generally above the first position.

In the first position the number of rear wheels may be structured to engage a surface on which the shopping cart travels and in the second position the number of rear wheels may be spaced a distance from the surface.

The portion of the main container may comprise a crossbar member that extends between the opposing side panels. The portion of the main container may comprise a pair of roller members and each roller member may be rotatably coupled to a respective one of the opposing side panels. The portion of the main container may comprise a first protrusion extending from one of the opposing side panels and a second protrusion extending from the other of the opposing side panels.

The main container may have a shelf member movably coupled to the main container. The shelf member may be hingedly coupled to the front panel. Each of the opposing side panels may have a front portion, and the shelf member may be pivotally coupled to the front portion of each of the opposing side panels.

The frame may include a rear handle coupled thereto, the rear handle comprising a first curved portion, a second curved portion, and a generally straight portion between the first curved portion and the second curved portion.

The frame may include a secondary container coupled thereto, the secondary container being positioned above a rear portion of the main container. The secondary container may comprise a seat portion and a number of apertures. The seat portion being structured to receive an occupant seated therein. Each of the number of apertures being structured to receive therethrough a leg member of the occupant. The secondary container may be of unitary construction and include one or more elements from the group consisting of: a number of holders, a writing surface, a hook member, and a clip member. The secondary container may be located entirely external to the main container. The secondary container may be structured to accommodate a child seated therein. The secondary container may be is structured to accommodate a child seated therein while the shopping cart is fully nested inside another similarly constructed cart. The secondary container may comprise a central storage area comprising a generally flat bottom portion and a generally open front portion. the flat bottom portion may be structured to receive a number of items placed thereon and the generally open front portion may provide a generally unobstructed view of the main container.

The main container may have a first width and the frame may include a lower shelf member coupled thereto, wherein the lower shelf member has a second width that is less than the first width.

The lower shelf member may comprise a generally planar member bounded by a front lip portion at one end and a rear stop portion at an opposite second end.

One of the pair of opposing side panels may comprise a number of support members, each of the number of support members being structured to couple an auxiliary container to the main container. Each of the support members may comprise a portion of the one of the pair of opposing side panels. Each of the number of support members may be generally defined by an aperture disposed in the one of the pair of opposing side panels. The auxiliary container may be a plastic grocery bag.

Other objects of the invention are achieved by providing a shopping cart comprising a frame, a number of front wheel assemblies and a number of rear wheel assemblies that are coupled to and support the frame, a main container coupled to the frame, and a secondary container coupled to the frame and positioned above a rear portion of the main container. The main container comprising a base, a front panel, a rear panel, a pair of opposing side panels each having a top edge, and a shelf member movably coupled to the main container. The front panel and the pair of opposing side panels being coupled together and extending upward from the base. The rear panel being pivotally coupled to the frame. A portion of the main container is structured to engage each of the top edges of the opposing side panels of another similarly constructed cart as the other cart is nested into the shopping cart. The engagement causes the number of rear wheel assemblies to be moved from a first position to a second position generally above the first position.

One of the pair of opposing side panels may comprise a number of support members, each of the number of support members being structured to couple an auxiliary container to the main container.

BRIEF DESCRIPTION OF THE DRAWINGS

A full understanding of the disclosed concept can be gained from the following description of the preferred embodiments when read in conjunction with the accompanying drawings in which.

DETAILED DESCRIPTION OF THE PREFERRED EMBODIMENTS

Figure 1:
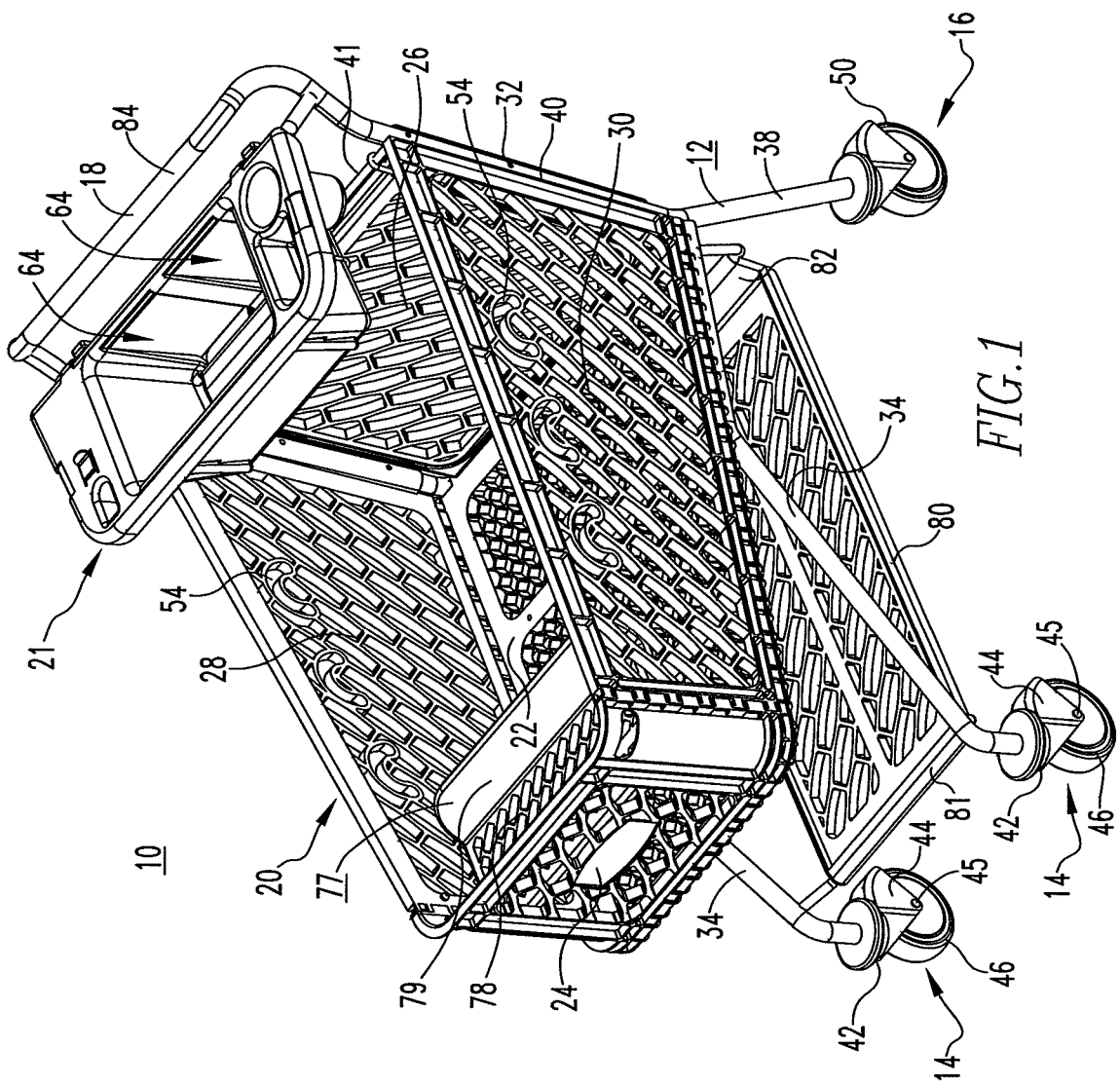
FIG. 1 is an isometric view of a shopping cart in accordance with an embodiment of the invention.

For purposes of the description hereinafter, the terms "upper", "lower", "vertical", "horizontal", "axial", "top", "bottom", "aft", "behind", and derivatives thereof shall relate to the invention as it is oriented in the drawing FIGS. or as it is oriented when resting upright on a flat horizontal surface. However, it is to be understood that the shopping cart may assume various alternative configurations when the invention is moved about or the shopping cart is resting in a non-upright position. It is also to be understood that the specific elements illustrated in the FIGS. and described in the following specification are simply example embodiments of the invention. Therefore, specific dimensions, orientations and other physical characteristics related to the embodiments disclosed herein are not to be considered limiting.

As employed herein, the term "number" shall mean one or an integer greater than one (i.e., a plurality). As employed herein, the statement that two or more parts are "attached", "connected", "coupled", or "engaged" together shall mean that the parts are joined together either directly or joined through one or more intermediate parts.

Turning to FIGS. 1-4, a shopping cart 10 is shown. The shopping cart 10 includes a frame 12, a number of front wheel assemblies 14 and a number of rear wheel assemblies 16 supporting the frame 12, a rear handle 18 coupled to the frame 12, a main container 20 coupled to the frame 12 for holding items (not shown), and a secondary container 21 coupled to the frame 12 generally at or near rear handle 18. The main container 20 includes a base 22, and a spaced apart front 24, rear 26 and opposing side walls 28 and 30, which are coupled together and extend upward from the base 22.

Figure 3:
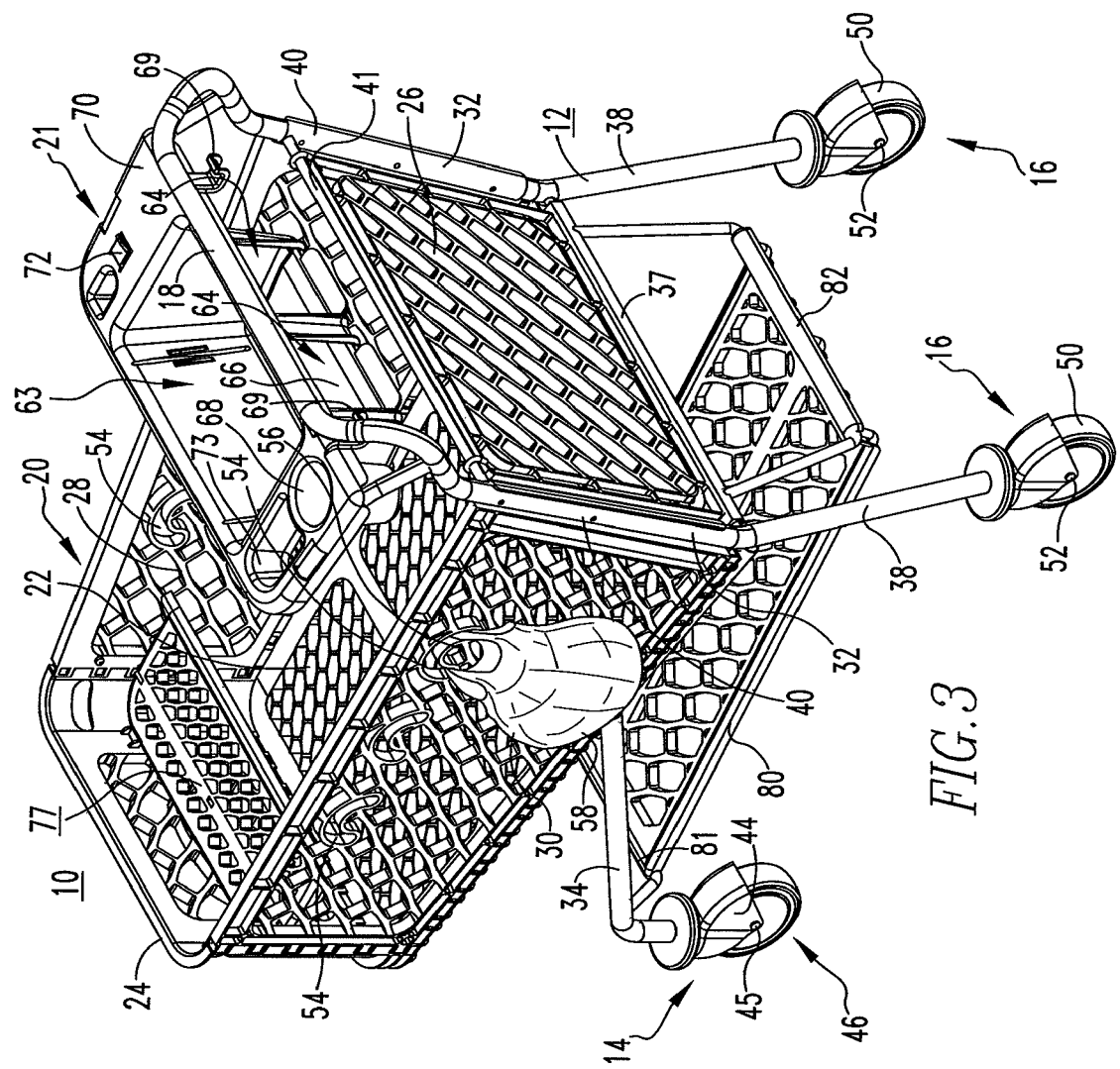
FIG. 3 is another isometric view of the shopping cart of FIG. 1 showing a side and rear portion of the shopping cart.

The frame 12 of the shopping cart 10 has the rear handle 18 coupled thereto, a number of upstanding support members 32 and a number of forward support members 34. The forward support members 34 are coupled to the upstanding support members 32 and generally extend from the upstanding support members 32 to the front wheel assemblies 14 which are coupled thereto. The upstanding support members 32 are coupled to the rear wheel assemblies 16. The frame 12 also has a front lateral support member 36 (FIG. 4) that is structured to support a portion of the main container 20 and a rear lateral support member 37 (FIG. 3).

The upstanding support members 32 are each preferably formed of a tubular, or other suitable member, bent into portions including a first portion 38 and an intermediate portion 40. The first portion 38 of each member of the upstanding support members 32 is coupled to one of the rear wheel assemblies 16 at one end and preferably extends at an angle toward the front 24 of the main container 20 until a point generally at or about the rear lateral support member 37 (FIG. 3). After reaching the point generally at or about the rear lateral support member 37 (FIG. 3), each of the upstanding support members 32 then preferably bends generally away from the front 24 of the main container 20 at an angle, forming the intermediate portion 40.

As is generally known in the art, the frame 12 is supported by a plurality of wheel assemblies. In general, the shopping cart 10 includes the front wheel assemblies 14 and the rear wheel assemblies 16. The front wheel assemblies 14 and the rear wheel assemblies 16 may include a caster 42, a generally U-shaped bracket 44, and a wheel 46. At least one of the rear wheel assemblies 16 may be provided with a brake (not shown) coupled thereto that is structured to stop movement of the rear wheel assemblies 16. Each U-shaped bracket 44 for a respective castor 42 is adapted to pivot about a generally vertical axis, thereby allowing the castor 42 to swivel. In addition, each U-shaped bracket 44 includes a shaft 45 which extends horizontally through the U-shaped bracket 44 defining an axis about which the wheel 46 rotates. Each rear wheel assembly 16 includes a rear wheel 50 and a rear shaft 52. The rear shaft 52 extends horizontally through the rear wheel 50 and couples the rear wheel 50 to one of the upstanding support members 32, thereby providing a connection between the rear wheel 50 and the upstanding support members 32 and providing an axis about which the rear wheel 50 can rotate. Commonly, the front wheel assemblies 14 can pivot freely about the vertical axes while the rear wheel assemblies 16 are generally fixed with respect to such vertical axes, thus providing increased stability to the rear of a cart 10.

The shopping cart 10, as mentioned above, includes a main container 20. The main container 20 can be formed of metal, plastic, or a metal/plastic combination. Preferably, the main container is formed from recycled content plastic. The main container 20 can be formed from an open latticework structure, an intersecting bar structure, solid sheets of material or combinations thereof. The main container 20 is adapted to be supported by the frame 12 and is coupled to the upstanding support members 32, the forward support members 34 and the front and rear lateral support members 36 (FIG. 4) and 37 (FIG. 3).

Each of the opposing side walls 28 and 30 of the main container 20 includes a number of apertures or cut-out portions 54 that generally surround a support portion 56. As shown in FIG. 3, the cut out portion 54 and support portion 56 are generally arranged such that a container, such as, without limitation, a plastic grocery bag 58 may be hung outside (FIG. 3) or inside (not shown) the main container 20 of the shopping cart 20. Although a generally crescent shape cut-out 54 is shown in the example depicted, it is to be appreciated that the shape of such cut-out portion 54 and accompanying support portion 56 may be varied without departing from the scope of the present invention. Additionally, it is to be appreciated that the quantity and location of such cut-out portions 54 and accompanying support portions 56 on the main container 20 (including front wall 24 and or rear wall 26) may be varied without departing from the scope of the invention.

Figure 5:
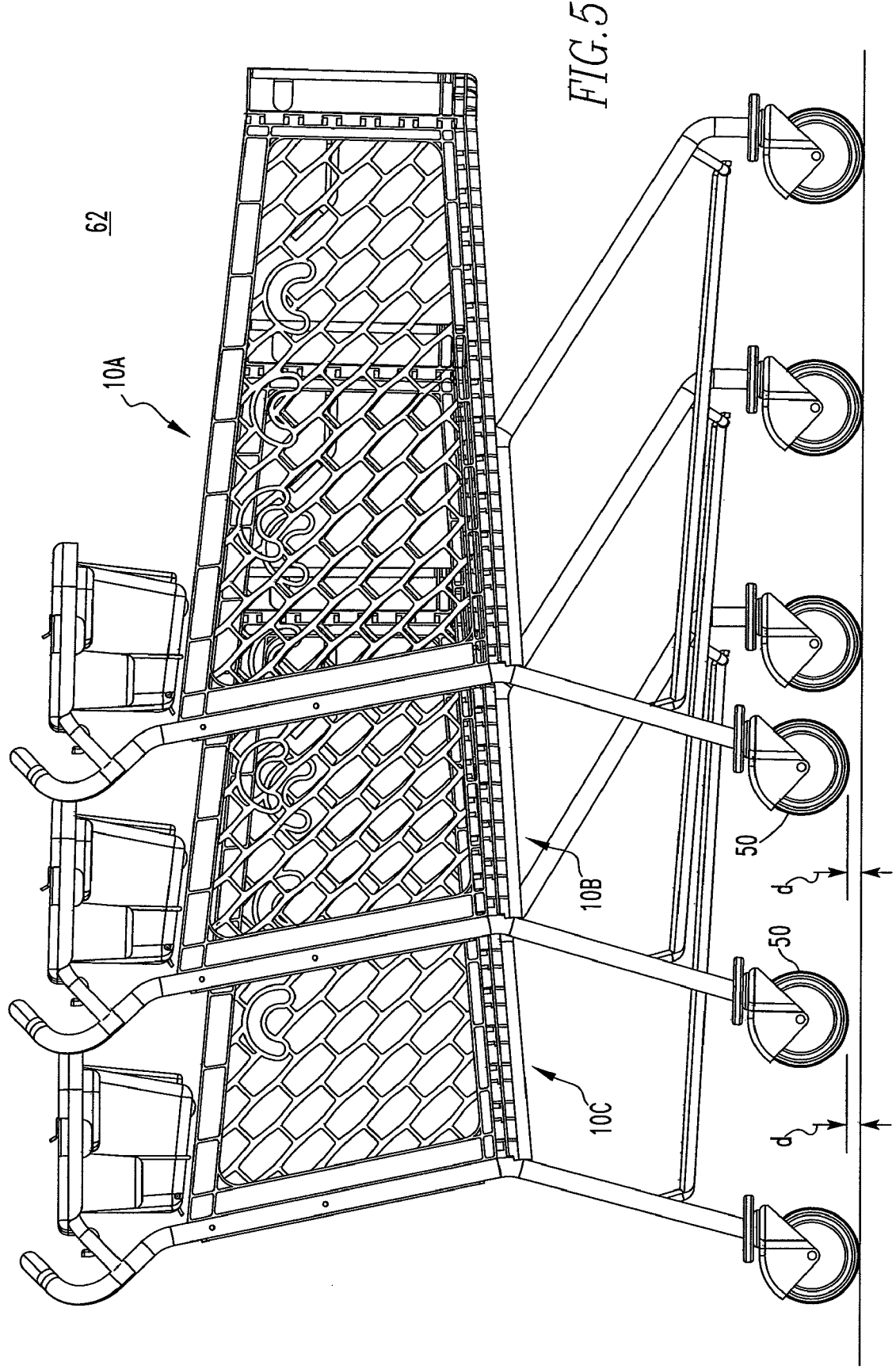
FIG. 5 is a side elevation view of a number of shopping carts nested together in accordance with an embodiment of the invention.

The rear 26 of the main container 20 is pivotally attached to the frame 12 at or about the top edge (not numbered) of rear 26. Specifically, the upper portion of the rear 26 is pivotally attached to the upstanding support member 32, such as through pivotal attachment to a crossbar 41 (FIG. 3). The pivotal connection allows the rear 26 to be moved forward and upward out of the main container 20 to allow one shopping cart 10 to nest within another shopping cart 10 as shown in FIG. 5. When the shopping carts 10 are not in use by shoppers, such nesting is advantageous in minimizing the amount of floor space consumed by the shopping carts 10. Preferably, crossbar 41 is positioned such that when two shopping carts 10 are nested together (such as carts 10A and 10B of FIG. 5), the crossbar 41 of the front cart 10A rides along the top edges of side walls 28 and 30 of the back cart 10B. Preferably, the top edges of side walls 28 and 30 are generally inclined from the front 24 toward the rear 26 of the main container 20. As shown by the row of nested carts 62 in FIG. 5, such interaction of crossbar 41 with the edges of the generally inclined side walls 28 and 30 results in each of the rear wheels 50 of the more forward cart (in this example cart 10A) being elevated a distance d from the surface on which each of the nested carts 10 rest. Such interaction between the crossbar 41 of a front cart 10A and the top edges of the side walls 28 and 30 of a rear cart 10B can be repeated by the nesting of additional carts to those previously nested, such as shown by the interaction of carts 10B and 10C (if carts 10A and 10B were previously nested) or carts 10A and 10B (if carts 10B and 10C were previously nested) in FIG. 5. It is to be appreciated that by raising the typically fixed rear wheels 50 of each of the carts 10 forward of the rear cart 10 in the row of nested carts 62 a distance d from the surface (not numbered) on which the carts rest, a row of nested carts 62 may be maneuvered in a manner substantially similar to movement of a single cart (i.e., the forward portion of the row 62 may be readily moved laterally). Such maneuverability is highly desirable while moving nested carts during common routine activities (e.g., without limitation, maneuvering a row of nested carts 62 through a crowded parking lot). Additionally, elevating the rear wheels 50 helps to eliminate stresses commonly placed on the rear wheels 50 and their related rear wheel assemblies 16 while moving rows of nested carts.

Figure 6:
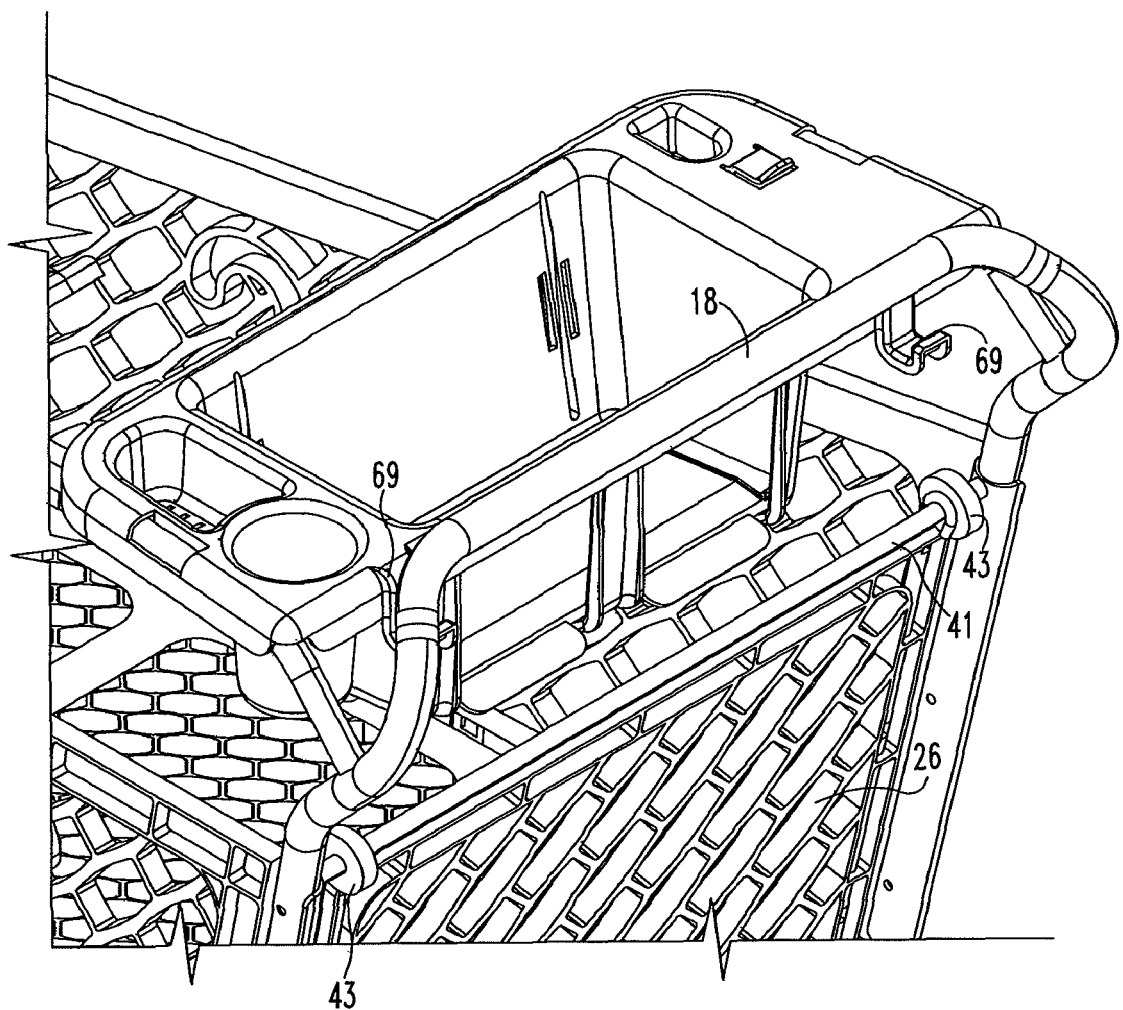
FIG. 6 is an isometric view of a portion of a shopping cart in accordance with an embodiment of the invention.

As shown in the embodiment of FIG. 6, a pair of roller members 43 may be attached to the frame 12 at or about the top edge of rear 26. In such embodiment, each of the roller members 43 is positioned such that when two shopping carts 10 are nested together (such as carts 10A and 10B of FIG. 5), the roller members 43 of the front cart 10A ride along the top edges of side walls 28 and 30 of the back cart 10B in a manner similar to that described above with respect to the crossbar 41.

It is to be appreciated that a further embodiment (not shown) may comprise a partial crossbar 41 that only extends only a short distance inward from sides 28,30 of main container 20. Such embodiment may function similarly when nesting as the embodiments described in conjunction with FIG. 5. Additionally, such embodiment may also include roller members 43 in addition to, or in lieu of a partial crossbar 41 and function similarly to the embodiment described in conjunction with FIG. 6.

As shown in FIGS. 1-4, a multipurpose secondary container 21 may be provided near the rear handle 18. Optionally, the secondary container 21 may be an integrally formed component (not shown) of the rear handle 18. The secondary container 21 is preferably of generally unitary construction and formed from a highly recycled content plastic, although other suitable materials may be employed (e.g., without limitation, metal, plastic, or a metal/plastic combination).

The secondary container 21 is structured to accommodate and provide optional seating for a small child (not shown) on the cart 10. Accordingly secondary container 21 is provided with a seat portion 63 (FIGS. 3 and 4) and a number of apertures 64 (FIGS. 1 and 3) located proximate thereto, through which a seated child's legs may extend. Secondary container 21 preferably further includes one or more movable panels 66 at or about the apertures 64 that are generally movable from a stowed position (FIGS. 3 and 4) that does not interfere with a child seated within the secondary container 21, to an active position (not shown) in which the one or more panels 66 are oriented in a generally vertical position generally covering the apertures 64 such that the secondary container 21 may be used for carrying of items (not shown) as an addition to, or in place of the main container 20.

Figure 2:
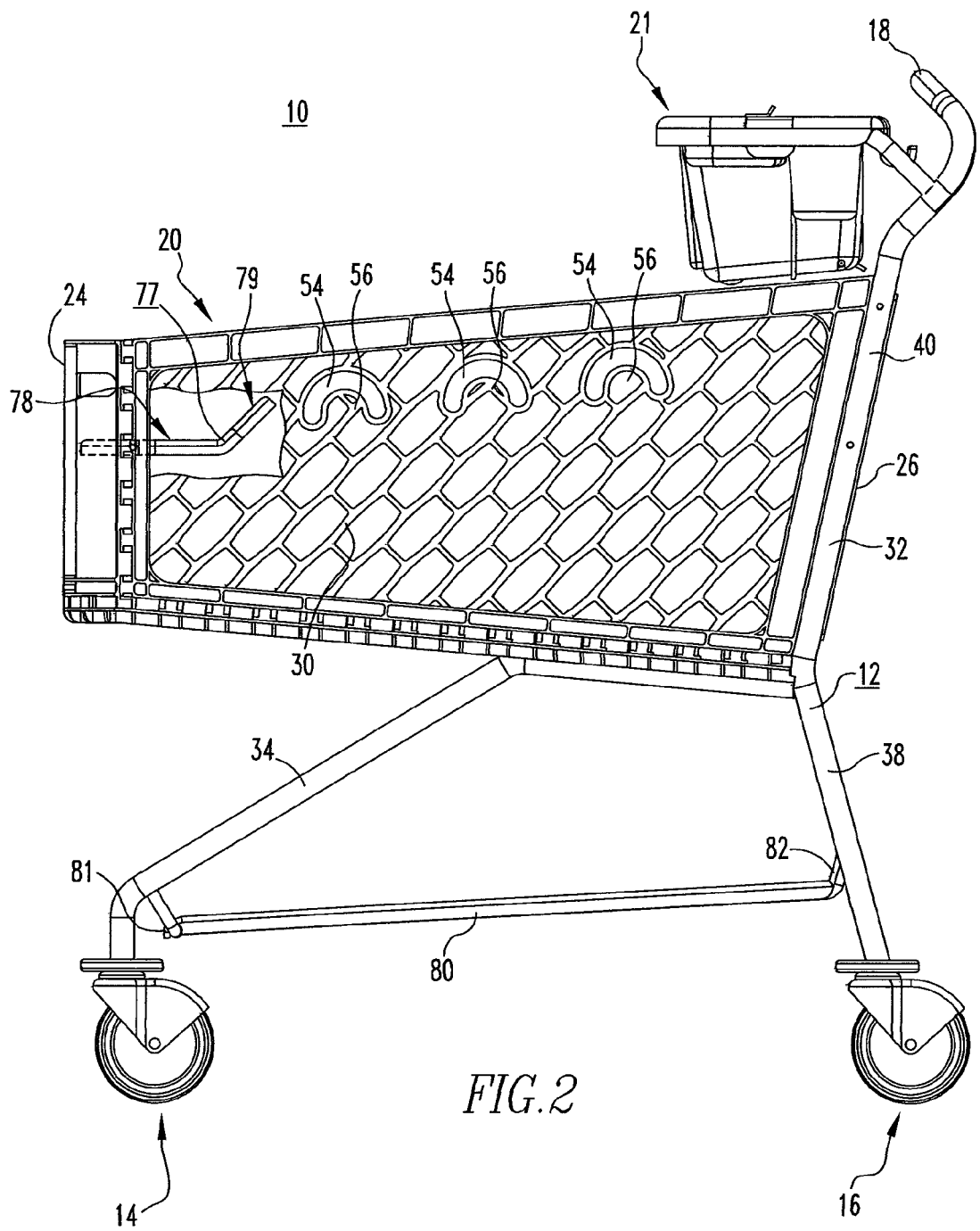
FIG. 2 is a side view of the shopping cart of FIG. 1 with a portion removed to show details of a shelf member.

In the embodiment depicted in FIGS. 1-5, the secondary container 21 is shown coupled to the frame 12 such that the secondary container 21 is positioned generally above a rear portion of the main container 20. Preferably, the secondary container 21 is positioned entirely outside of the main container 20, as best shown in FIG. 2. Such positioning of the secondary container 21 is desirable as it allows for the entire main container 20 to be used for carrying of items, in contrast to known designs that occupy a portion of the main container 20 when a child is seated on the cart. Additionally, such positioning is desirable as the secondary container 21 is elevated above, and separate from, the movable rear 26 of the main container 20, thus providing easier nesting and de-nesting of carts 10 through use of a simpler foldable mechanism than known mechanisms. Such design also allows for a child or other items to be placed in the secondary container 21 while a cart 10 is still nested within another cart 10 (such as shown in FIG. 5), thus providing for greater ease de-nesting as the hands of a cart user can be freed from such items prior to de-nesting of the cart 10 form a row of nested carts 62.

It is to be appreciated, that although secondary container 21, as shown in FIGS. 1-4, is shown as only accommodating one child, secondary container 21 may be adapted to provide for seating of more than one child without departing from the scope of the invention. It is also to be appreciated that such elevated positioning provides for a seated child to be positioned a distance from items stored in the main container 20 thus reducing the chances of a seated child grabbing items thus potentially causing damage to the child or the items. It is to be further appreciated that such unitary construction provides a seating area that may be easily cleaned and has little or no "pinch points" which could potentially injure a seated child.

Figure 4:
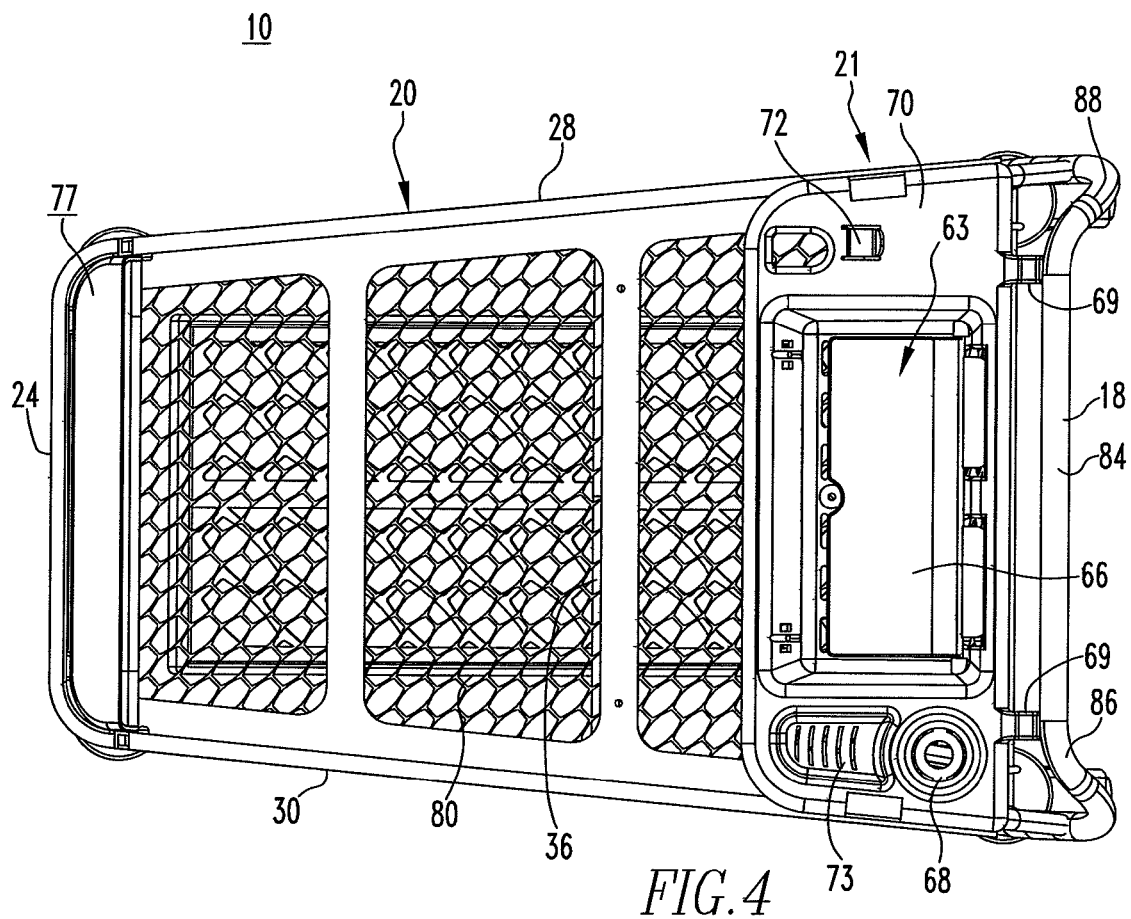
FIG. 4 is a top view of the shopping cart of FIGS. 1-3 showing the shelf member flipped in an upward and forward direction.

Additionally, the secondary container 21 may also include a number of holders 68 coupled thereto (not shown) or formed therein (see FIGS. 3 and 4). The holders 68 may be structured for receiving cups, flowers, change, or other items. A number of hook members 69 (FIGS. 3 and 4) may also be included on or integral with secondary container 21. Such hook members 69 may be used, for example, without limitation, for hanging a purse of jacket while the cart is in use. Optionally, a writing surface 70 and/or clip mechanism 72 may be formed in, or coupled to, the secondary container 21. The writing surface 70 may provide a convenient surface for the shopper to take notes on a piece of paper (not shown) or to cross off items from a grocery list as the sought after items are deposited in the shopping cart 10. A recess 73 may also be included located adjacent to the number of holders 68 for containing small items (e.g., without limitation, car keys, change, snacks).

Figure 7:
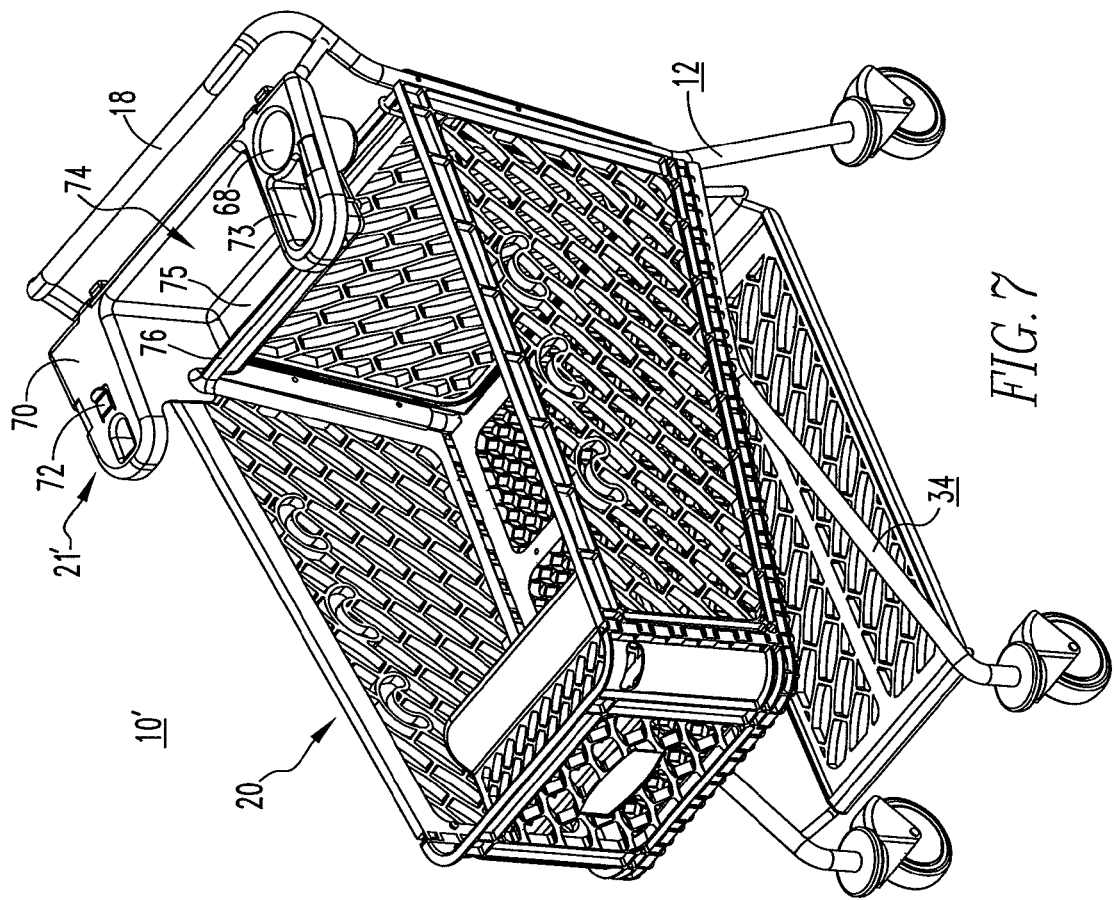
FIG. 7 is an isometric view of a shopping cart in accordance with another embodiment of the invention.
Figure 8:
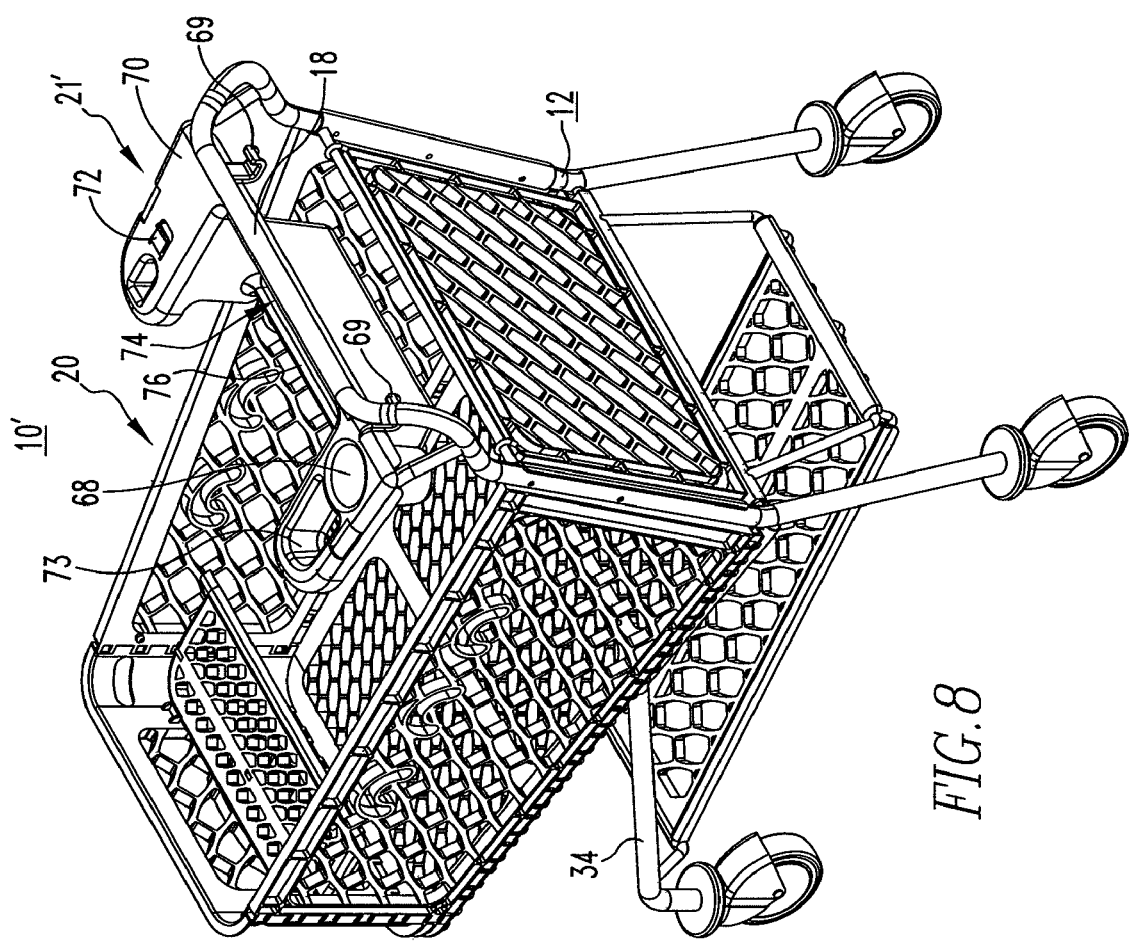
FIG. 8 is another isometric view of the shopping cart of FIG. 7 showing a side and rear portion of the shopping cart.
Figure 9:
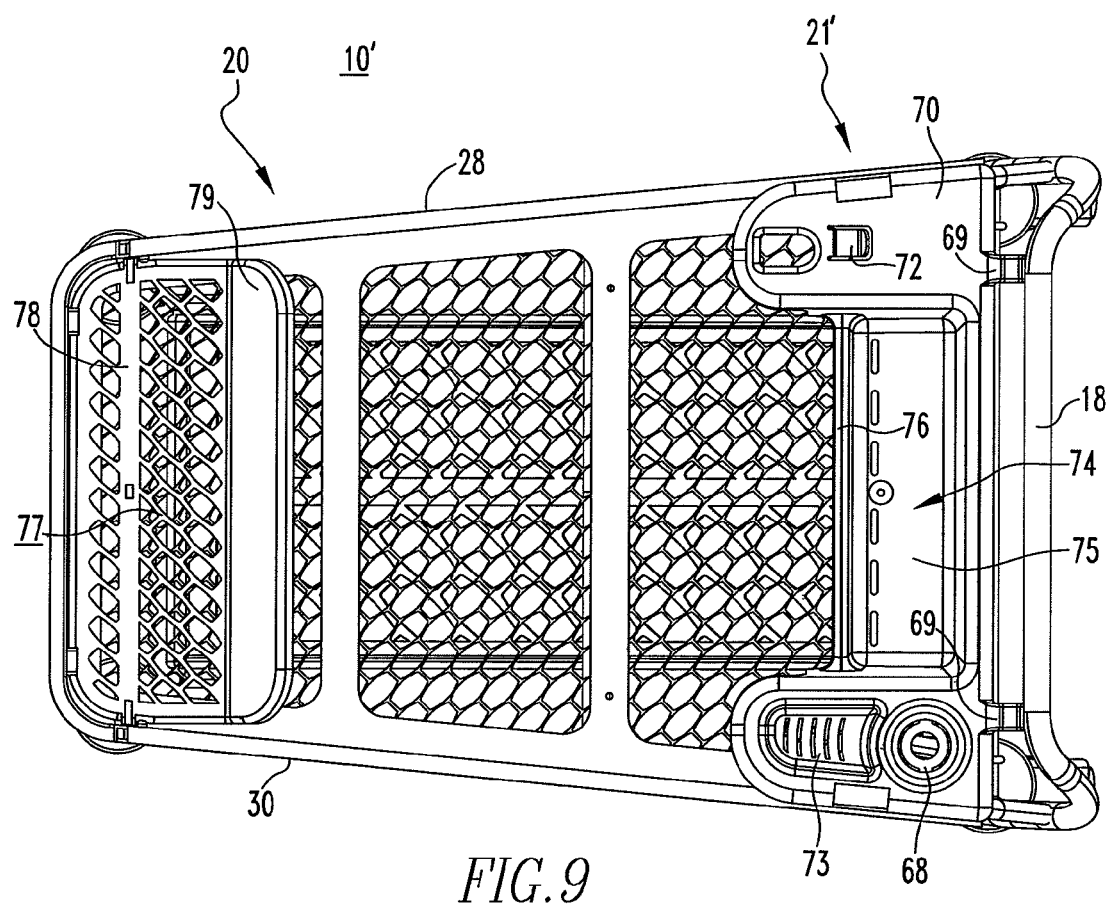
FIG. 9 is a top view of the shopping cart of FIGS. 7 and 8.

FIGS. 7-9 show another embodiment of a shopping cart 10' similar to that described in conjunction with FIGS. 1-4 aside from the secondary container 21'. Like the secondary container 21 discussed in conjunction with FIGS. 1-4, secondary container 21' is also preferably of generally unitary construction and formed from a highly recycled content plastic, although other suitable materials may be employed (e.g., without limitation, metal, plastic, or a metal/plastic combination). Secondary container 21' is likewise coupled to the frame 12 such that the secondary container 21' is positioned generally above a rear portion of the main container 20. Preferably, the secondary container 21' is positioned entirely outside of the main container 20. In a preferred embodiment, the secondary containers 21 and 21' may be selectively coupled to the frame 12 in a manner such that the secondary containers 21 and 21' may be readily interchanged as desired by a shopping cart owner or operator. Like secondary container 21, secondary container 21' may also include a number of holders 68 coupled thereto (not shown) or formed therein. The holders 68 may be structured for receiving cups, flowers, change, or other items. A number of hook members 69 (FIGS. 8 and 9) may also be included on or integral with secondary container 21'. Such hook members 69 may be used, for example, without limitation, for hanging a purse of jacket while the cart is in use. Optionally, a writing surface 70 and/or clip mechanism 72 may be formed in, or coupled to, the secondary container 21'. A recess 73 may also be included located adjacent to the number of holders 68 for containing small items (e.g., without limitation, car keys, change, snacks).

Unlike secondary container 21 of FIGS. 1-4 which includes a child seat portion 63, secondary container 21' of FIGS. 7-9 includes a central storage area 74 having a generally flat bottom portion 75 for placing objects upon. As best shown in FIGS. 8 and 9, central storage area 74 has a generally open front portion (not numbered) that allows for high visibility of the main container 20 to an operator of the shopping cart 10' positioned at or near handle 18. Central storage area 74 further includes a forward lip 76 along the front portion to help keep items (not shown) placed on bottom portion 74 from falling therefrom.

Main container 20 may be provided with a shelf member 77 generally located at or about the front 24. Referring to FIG. 2 which shows a portion of the 30 of cart 10 removed, shelf member 77 preferably includes a generally horizontal portion 78 and a generally inclined portion 79. Shelf member 77 is preferably movable between a first, generally horizontal position, such as shown in FIGS. 1 and 2, and a second, generally vertical position, such as shown in FIG. 4. Such movement may be readily achieved through pivotal coupling of the shelf member 77 to each of the side walls 28 and 30, through hinged coupling to the front 24, or through other suitable means. When in the first, generally horizontal position, such as shown in FIG. 1, shelf member 77 provides a generally elevated storage area for smaller or fragile items (not shown, e.g., without limitation, eggs, bread, produce) for which placement in the main container may be undesirable. Inclined portion 79 acts to help retain such items on shelf member 77 during use of the cart 10. Additionally, inclined portion 79 may assist in moving shelf member 77 from the horizontal position to the vertical position when a second cart 10 is nested within a first cart 10 upon the front portion 24 of the second cart contacting the inclined portion 79. It is to be appreciated that the inclination angle of inclined portion 79 may be varied as well as other suitable structures may be employed in lieu of inclined portion 79 for retention of items on shelf member 77 without departing from the scope of the present invention. Movement of shelf member 77 allows for shelf member 77 to be moved into a more compact position when additional room in the main container 20 is desired.

The shopping cart 10 may be provided with a lower shelf 80 that is structured to carry generally bulky items (not shown) that would tend to occupy an undesirably large amount of the main container 20 or that would be awkward or difficult to place in the main container. Preferably lower shelf 80 includes a low-profile front lip 81 and a high-profile rear stop 82. The front lip 81 helps to prevent items from slipping off the front of lower shelf 80 without interfering with placement of items on the lower shelf 80 from the front of the cart 20. The rear stop 82 helps to prevent items from falling off the rear of the lower shelf 80 and provides a generally rigid backing for packing of items.

Lower shelf 80 may be formed of metal, plastic, or a metal/plastic combination and can be formed from an open latticework structure, an intersecting bar structure, solid sheets of material or combinations thereof. Lower shelf 80 is preferably formed from recycled content plastic and, as depicted in the FIGS, is preferably formed from the same material and general appearance as the main container 20. The lower shelf 80 is preferably, coupled to the frame 12 of shopping cart 10. More particularly, lower shelf 80 is preferably coupled at or about the front lip 81 to each of the forward support members 34 and coupled at or about the rear stop 82 to the rear lateral support member 37. Lower shelf 80 is preferably of narrower width than the main container 20. Similarly, front lip 81 of the lower shelf 80 is preferably set back a distance (not numbered) relative to the front of the main container 20. Such arrangements tend to increase the safety of the cart 10 by reducing the possibility of a child standing on the lower shelf 80 and climbing or attempting to ride on the cart 10.

Referring to FIG. 4, rear handle 18 is preferably of generally tubular construction and includes a generally straight central portion 84 bounded by a first curved portion 86 at one end and a second curved portion 88 at an opposite end. Such curved portions 86 and 88 provide the rear handle 18 with an improved ergonomic design over known cart handle designs. All or part of the rear handle 18 may be covered by a permanent or removable covering. Such covering may be formed of rubber, plastic, or other suitable material and may provide for increased handle comfort as well as a basis for adding decorative ornamentation or identification/advertising to a cart 10.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended hereto and any and all equivalents thereto.

What is claimed is:

1. A shopping cart comprising:
   a frame;
   a number of front wheel assemblies and a number of rear wheel assemblies that are coupled to and support the frame;
   a main container coupled to the frame, the main container comprising:
      a base,
      a front panel,
      a rear panel, and
      a pair of opposing side panels each having a top edge, wherein the front panel and the pair of opposing side panels are coupled together and extend upward from the base, and wherein the rear panel is pivotally coupled at or near the frame;
   wherein a portion of the main container is structured to engage each of the top edges of the opposing side panels of another similarly constructed cart as the other cart is being nested into the shopping cart, and wherein the engagement causes the number of rear wheel assemblies to be moved from a first position to a second position generally above said first position.

2. The shopping cart of claim 1 wherein in the first position the number of rear wheels are structured to engage a surface on which the shopping cart travels and wherein in the second position the number of rear wheels are spaced a distance from the surface.

3. The shopping cart of claim 1 wherein the portion of the main container comprises a crossbar member that extends between the opposing side panels.

4. The shopping cart of claim 1 wherein the portion of the main container comprises a pair of roller members and wherein each roller member is rotatably coupled to a respective one of the opposing side panels.

5. The shopping cart of claim 1 wherein the portion of the main container comprises a first protrusion extending from one of the opposing side panels and a second protrusion extending from the other of the opposing side panels.

6. The shopping cart of claim 1 wherein the main container has a shelf member movably coupled to the main container.

7. The shopping cart of claim 6 wherein the shelf member is hingedly coupled to the front panel.

8. The shopping cart of claim 6 wherein each of the opposing side panels have a front portion, and wherein the shelf member is pivotally coupled to the front portion of each of the opposing side panels.

9. The shopping cart of claim 1 wherein the frame includes a rear handle coupled thereto, said rear handle comprising:
   a first curved portion;
   a second curved portion; and
   a generally straight portion between said first curved portion and said second curved portion.

10. The shopping cart of claim 1 wherein the frame includes a secondary container coupled thereto, the secondary container being positioned above a rear portion of the main container.

11. The shopping cart of claim 10 wherein the secondary container comprises:
    a seat portion; and
    a number of apertures,
    wherein the seat portion is structured to receive an occupant seated therein and wherein each of the number of apertures is structured to receive therethrough a leg member of the occupant.

12. The shopping cart of claim 10 wherein the secondary container is of unitary construction and includes one or more elements from the group consisting of: a number of holders, a writing surface, a hook member, and a clip member.

13. The shopping cart of claim 10 wherein the secondary container is located entirely external to the main container.

14. The shopping cart of claim 13 wherein the secondary container is structured to accommodate a child seated therein.

15. The shopping cart of claim 14 wherein the secondary container is structured to accommodate a child seated therein while the shopping cart is fully nested inside another similarly constructed cart.

16. The shopping cart of claim 10 wherein the secondary container comprises:
    a central storage area comprising a generally flat bottom portion and a generally open front portion,
    wherein the flat bottom portion is structured to receive a number of items placed thereon and wherein the generally open front portion provides a generally unobstructed view of the main container.

17. The shopping cart of claim 1 wherein the main container has a first width, wherein the frame includes a lower shelf member coupled thereto, and wherein the lower shelf member has a second width that is less than the first width.

18. The shopping cart of claim 17, wherein the lower shelf member comprises a generally planar member bounded by a front lip portion at one end and a rear stop portion at an opposite second end.

19. The shopping cart of claim 1 wherein one of the pair of opposing side panels comprises a number of support members, wherein each of the number of support members is structured to couple an auxiliary container to the main container.

20. The shopping cart of claim 19 wherein each of the support members comprises a portion of the one of the pair of opposing side panels.

21. The shopping cart of claim 20 wherein each of the number of support members is generally defined by an aperture disposed in the one of the pair of opposing side panels.

22. The shopping cart of claim 19 wherein the auxiliary container is a plastic grocery bag.

23. A shopping cart comprising:
    a frame;
    a number of front wheel assemblies and a number of rear wheel assemblies that are coupled to and support the frame;
    a main container coupled to the frame, the main container comprising:
       a base,
       a front panel,
       a rear panel,
       a pair of opposing side panels each having a top edge, wherein the front panel and the pair of opposing side panels are coupled together and extend upward from the base, and wherein the rear panel is pivotally coupled to the frame, and a shelf member movably coupled to the main container; and a secondary container coupled to the frame, the secondary container being positioned above a rear portion of the main container, wherein a portion of the main container is structured to engage each of the top edges of the opposing side panels of another similarly constructed cart as the other cart is being nested into the shopping cart, and wherein the engagement causes the number of rear wheel assemblies to be moved from a first position to a second position generally above said first position.

24. The shopping cart of claim 23 wherein one of the pair of opposing side panels comprises a number of support members, wherein each of the number of support members is structured to couple an auxiliary container to the main container.

* * * * *

UNITED STATES PATENT AND TRADEMARK OFFICE
CERTIFICATE OF CORRECTION

| | | |
|---|---|---|
| PATENT NO. | : 8,056,909 B2 | Page 1 of 1 |
| APPLICATION NO. | : 12/434232 | |
| DATED | : November 15, 2011 | |
| INVENTOR(S) | : William Richard Burdwood et al. | |

It is certified that error appears in the above-identified patent and that said Letters Patent is hereby corrected as shown below:

Front page, second column, under (74) Attorney, Agent, or Firm, second line, "Stephen A. Buccianeri, Esquire" should read --Stephen A. Bucchianeri, Esquire--.

Column 8, line 34, "preferably, coupled" should read --preferably coupled--.

Signed and Sealed this

Seventh Day of February, 2012

David J. Kappos
*Director of the United States Patent and Trademark Office*